US008781778B2

(12) United States Patent
Touchberry et al.

(10) Patent No.: US 8,781,778 B2
(45) Date of Patent: Jul. 15, 2014

(54) SYSTEMS AND METHODS FOR THERMAL GRADIENT COMPENSATION FOR RING LASER GYROSCOPES

(75) Inventors: Alan Bruce Touchberry, St. Louis Park, MN (US); Timothy J. Callaghan, Roseville, MN (US); Bruce A. Seiber, Arden Hills, MN (US)

(73) Assignee: Honeywell International Inc., Morristown, NJ (US)

( * ) Notice: Subject to any disclaimer, the term of this patent is extended or adjusted under 35 U.S.C. 154(b) by 314 days.

(21) Appl. No.: 13/250,267

(22) Filed: Sep. 30, 2011

(65) Prior Publication Data

US 2013/0085699 A1   Apr. 4, 2013

(51) Int. Cl.
*G01C 17/38*  (2006.01)
*G01C 19/66*  (2006.01)

(52) U.S. Cl.
CPC .................................. *G01C 19/662* (2013.01)
USPC ............................................. 702/94; 356/400

(58) Field of Classification Search
USPC ............................................. 702/94; 356/400
See application file for complete search history.

(56) References Cited

U.S. PATENT DOCUMENTS

| 4,035,081 | A | * | 7/1977 | Sepp et al. ..................... 356/459 |
| 4,411,527 | A | | 10/1983 | Gamertsfelder et al. |
| 4,867,567 | A | * | 9/1989 | Fidric ............................. 356/459 |
| 5,546,482 | A | * | 8/1996 | Cordova et al. ................. 385/12 |
| 6,208,414 | B1 | * | 3/2001 | Killpatrick et al. ............ 356/459 |
| 2005/0256659 | A1 | * | 11/2005 | Malvern et al. ................. 702/96 |
| 2010/0238450 | A1 | * | 9/2010 | Wang et al. .................... 356/460 |

OTHER PUBLICATIONS

Jianqiang, "Abstract: The compensation methods of the start-up drift of four frequency differential laser gyro", "2010 2nd International Conference on Advanced Computer Control (ICACC)", Mar. 27, 2010, p. 1 Published in: Changsha, China.
Mohammad-Nejad et al, "Performance Modeling of Ring Laser Gyro in Inertial Navigation System", "Iranian Journal of Electrical & Electronic Engineering", Jul. 2006, pp. 8290, vol. 2, No. 3 and 4.

(Continued)

*Primary Examiner* — John Breene
*Assistant Examiner* — Stephanie Bloss
(74) *Attorney, Agent, or Firm* — Fogg & Powers LLC

(57) ABSTRACT

Systems and methods for thermal gradient compensation for ring laser gyroscopes are provided. In one embodiment, a method for producing bias compensated angular rate measurements from a ring laser gyroscope comprises: sampling an angle measurement output from a laser block sensor to obtain an angular rate measurement; obtaining an laser block temperature measurement ($T_{block}$) for the laser block sensor; obtaining a temperature gradient measurement ($T_{diff}$) for at least one gradient line across a portion of the laser block sensor; calculating a rate bias error by applying parameters produced from the temperature measurement ($T_{block}$) and the temperature gradient measurement ($T_{diff}$) to a thermal gradient compensation model, wherein the thermal gradient compensation model includes at least one coefficient corresponding to the temperature gradient measurement ($T_{diff}$); and calculating a difference between the angle rate measurement and the rate bias error to produce a bias compensated angular rate measurement.

17 Claims, 8 Drawing Sheets

(56) References Cited

OTHER PUBLICATIONS

Seon, "Abstract: The compensation method for thermal bias of ring laser gyro", "21st Annual Meeting of the IEEE Lasers and Electro-Optics Society", Nov. 9, 2008, Publisher: IEEE.

Wu et al, "Thermal Characteristics and Thermal Compensation of Four Frequency Ring Laser Gyro", "Position Location and Navigation Symposium", Aug. 7, 2002, pp. 271-276, Publisher: IEEE.

He et al, "Temperature Error Modeling Study for Laser Gyro", "Journal of Physics: Conference Series International Symposium on Instrumentation Science and Technology", 2006, pp. 245-249, No. 48, Publisher: Institute of Physics Publishing.

Kester, "Section 2 Bridge Circuits", "Practical Design Techniques for Sensor Signal Conditioning", 1999, pp. 2.1-2.19, Publisher: Prentice Hall.

"NTC Thermistors", "Retrived from http://www.thermometrics.com/assets/images/ntcnotes.pdr", 1999, Publisher: Thermometrics, Inc.

Williams, "Bridge Circuits Marrying Gain and Balance", "Application Note 43", Jun. 1990, pp. AN43-1-AN43-48, Publisher: Linear Technology.

* cited by examiner

SYSTEMS AND METHODS FOR THERMAL GRADIENT COMPENSATION FOR RING LASER GYROSCOPES

CROSS-REFERENCES TO RELATED APPLICATIONS

This application is related to co-pending U.S. application Ser. No. 13/250,319, entitled "CIRCUITS FOR DETERMINING DIFFERENTIAL AND AVERAGE TEMPERATURES FROM RESISTIVE TEMPERATURE DEVICES", filed on even date herewith and herein incorporated by reference in its entirety.

BACKGROUND

The output bias error of a ring laser gyroscope will vary as a function of gyroscope temperature. Present thermal compensation models for addressing output bias are based on determining the gyroscope's average temperature and temperature rate of change over time. However, in the field, ring laser gyroscopes operate in environments that often produce temperature gradients across the gyroscope sensor block that will also alter bias error output behavior.

For the reasons stated above and for other reasons stated below which will become apparent to those skilled in the art upon reading and understanding the specification, there is a need in the art for systems and methods for thermal gradient compensation for ring laser gyroscopes.

SUMMARY

The embodiments of the present invention provide methods and systems for thermal gradient compensation for ring laser gyroscopes and will be understood by reading and studying the following specification.

In one embodiment, a method for producing bias compensated angular rate measurements from a ring laser gyroscope comprises: sampling an angle measurement output from a laser block sensor to obtain an angular rate measurement; obtaining an laser block temperature measurement ($T_{block}$) for the laser block sensor; obtaining a temperature gradient measurement ($T_{diff}$) for at least one gradient line across a portion of the laser block sensor; calculating a rate bias error by applying parameters produced from the temperature measurement ($T_{block}$) and the temperature gradient measurement ($T_{diff}$) to a thermal gradient compensation model, wherein the thermal gradient compensation model includes at least one coefficient corresponding to the temperature gradient measurement ($T_{diff}$); and calculating a difference between the angle rate measurement and the rate bias error to produce a bias compensated angular rate measurement.

DRAWINGS

Embodiments of the present invention can be more easily understood and further advantages and uses thereof more readily apparent, when considered in view of the description of the preferred embodiments and the following figures in which.

Figure 3A:
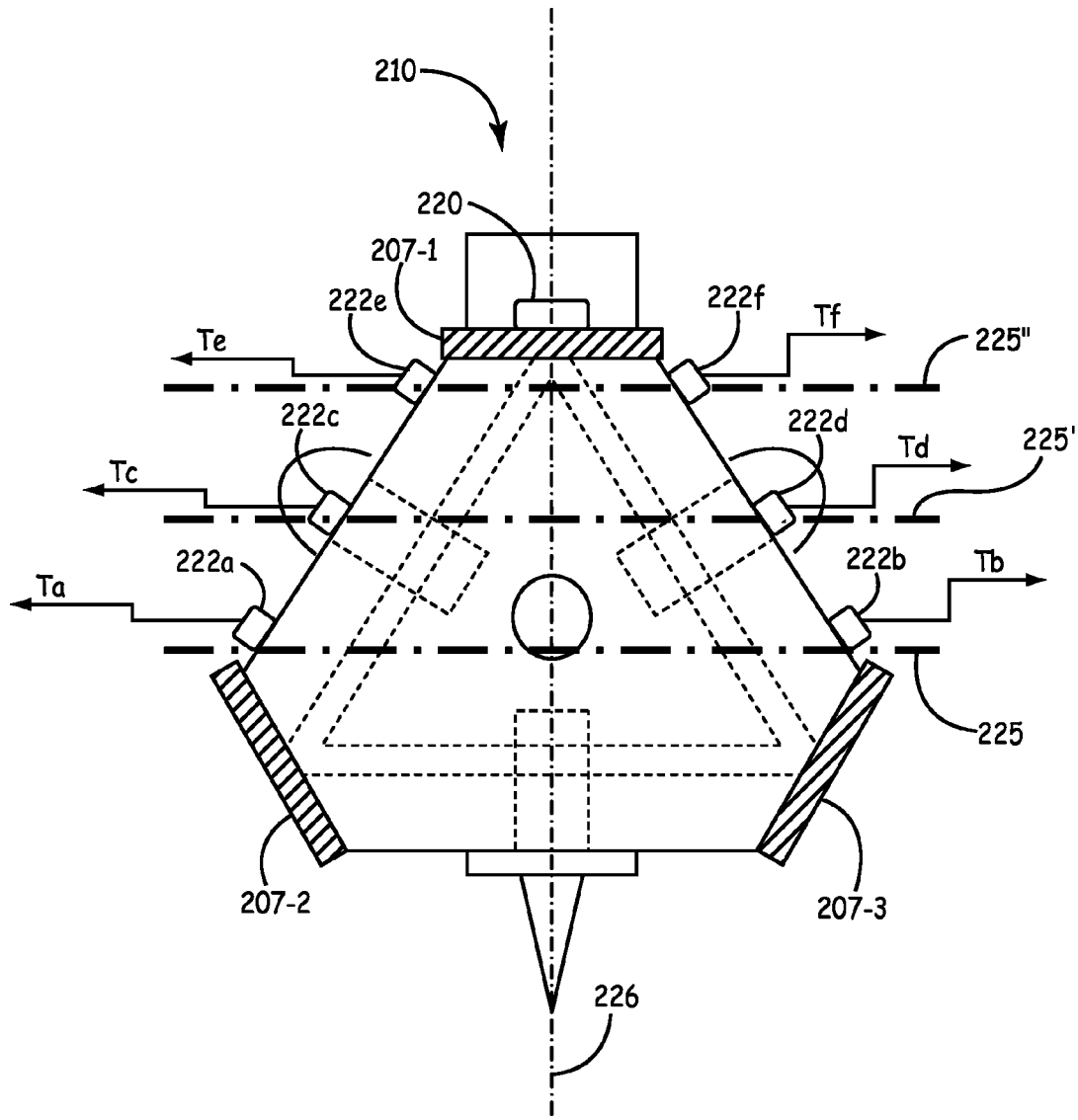
Figure 3B:
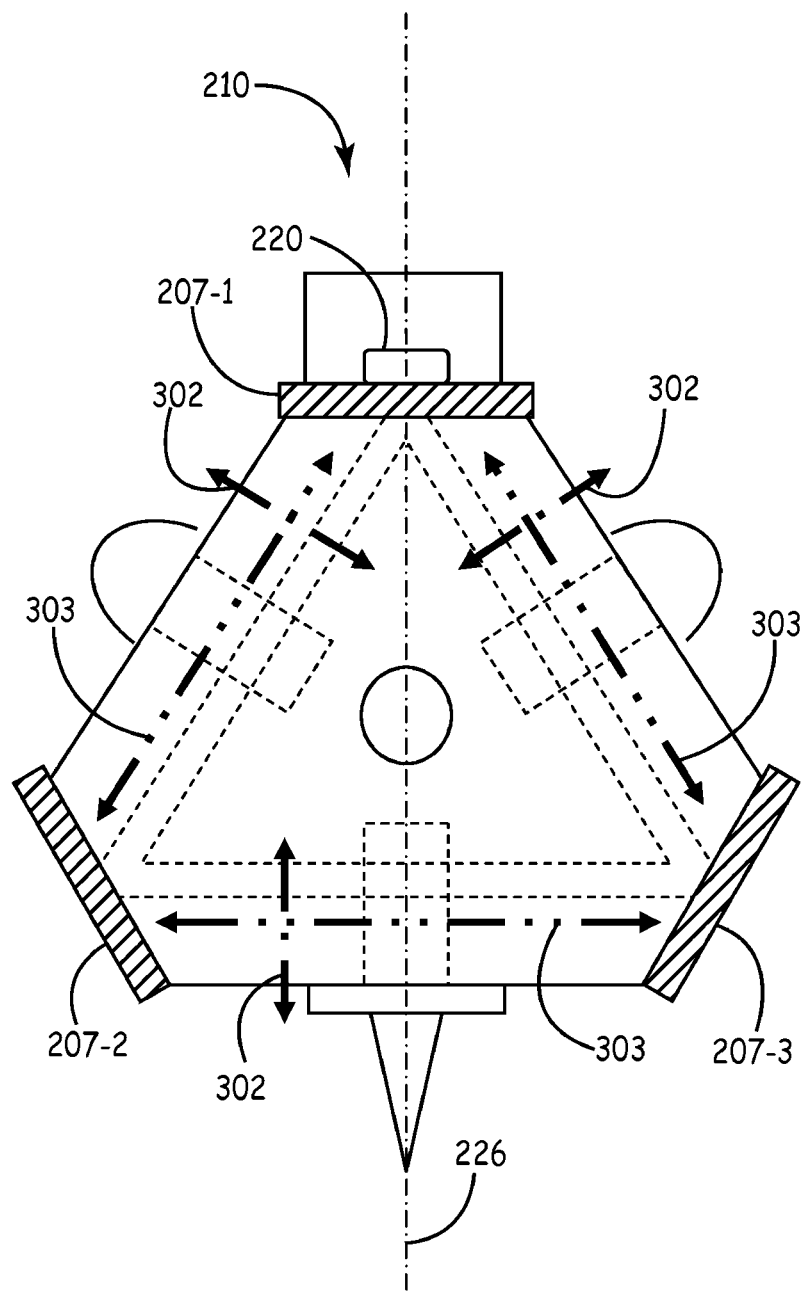
Figure 3C:
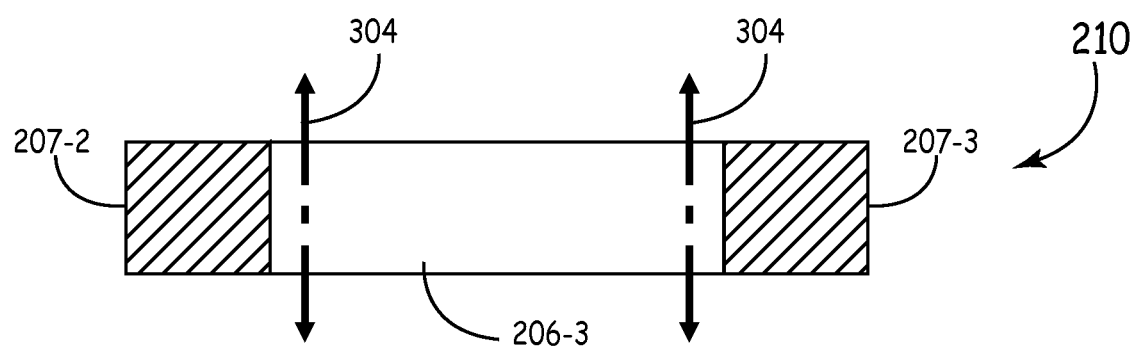
Figure 4A:
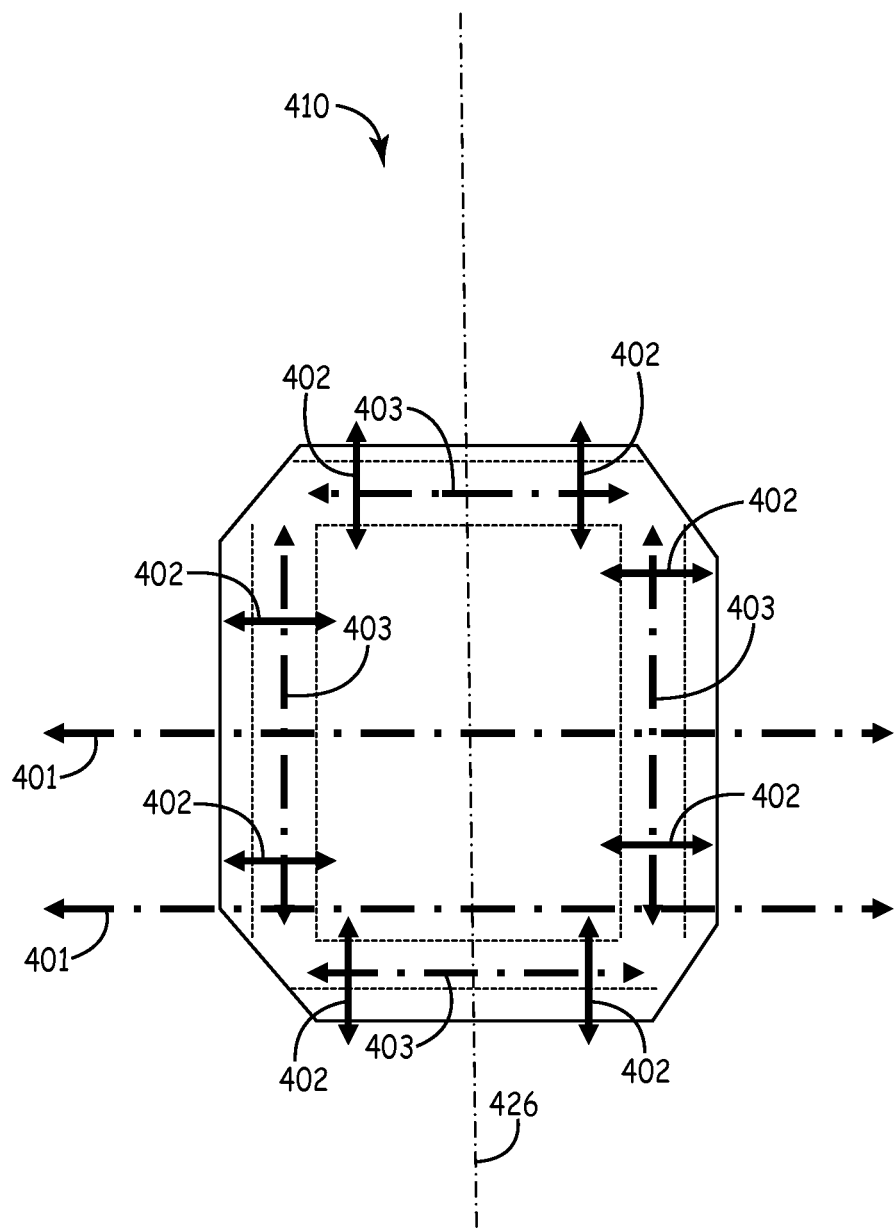
Figure 4B:
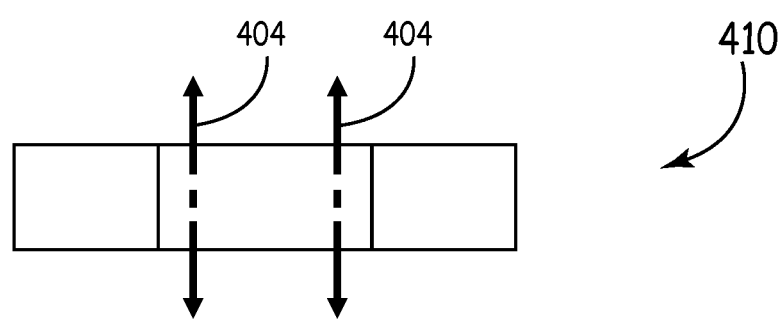
Figure 5:
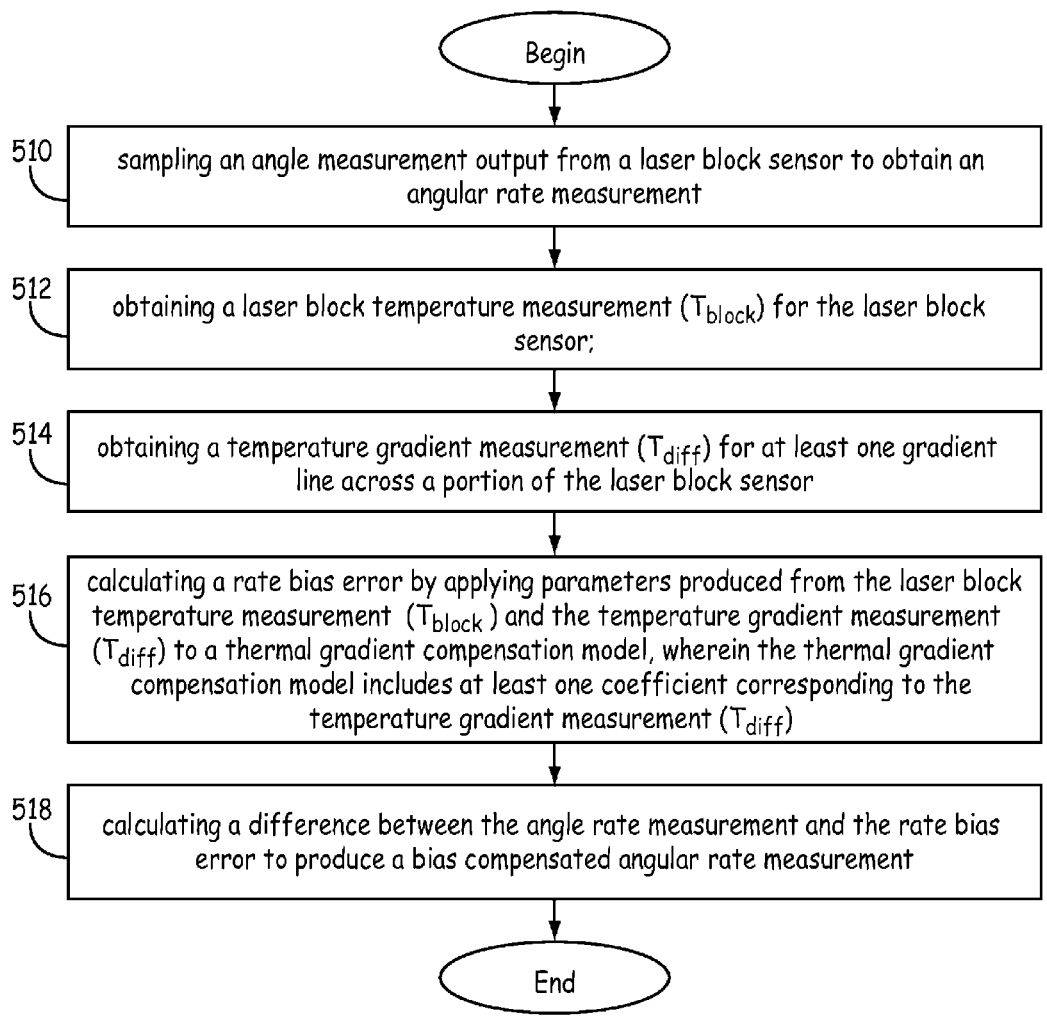

FIGS. 3*a*, 3*b*, 3*c* and 4*a*, 4*b* are diagrams of alternate embodiments for ring laser gyroscopes of the present invention; and FIG. 5 is a flow chart for a method of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is therefore not to be taken in a limiting sense.

Embodiments of the present invention provide systems and methods for compensating for spatial temperature gradients that develop across portions of a ring laser gyroscope sensor block during operation. This is accomplished by placing one or more sets of additional temperature sensors on the laser block sensor. Temperature gradients from these sensors are measured both during the calibration of the ring laser gyroscope as well as during operation. During calibration, gyroscope output data is captured along with laser block temperature, temperature rate of change over time, and the temperature gradient data. With this information, either a single, or multiple, regression is performed to calculate a set of coefficients that define a thermal gradient compensation model for the gyroscope. A least squares fit is one example of such a regression. In operation, corresponding temperature measurements are applied to the thermal gradient compensation model, from which a bias compensation factor is calculated. The bias compensation factor is removed from the gyroscope output data to produce a bias compensated rate data.

Figure 1:
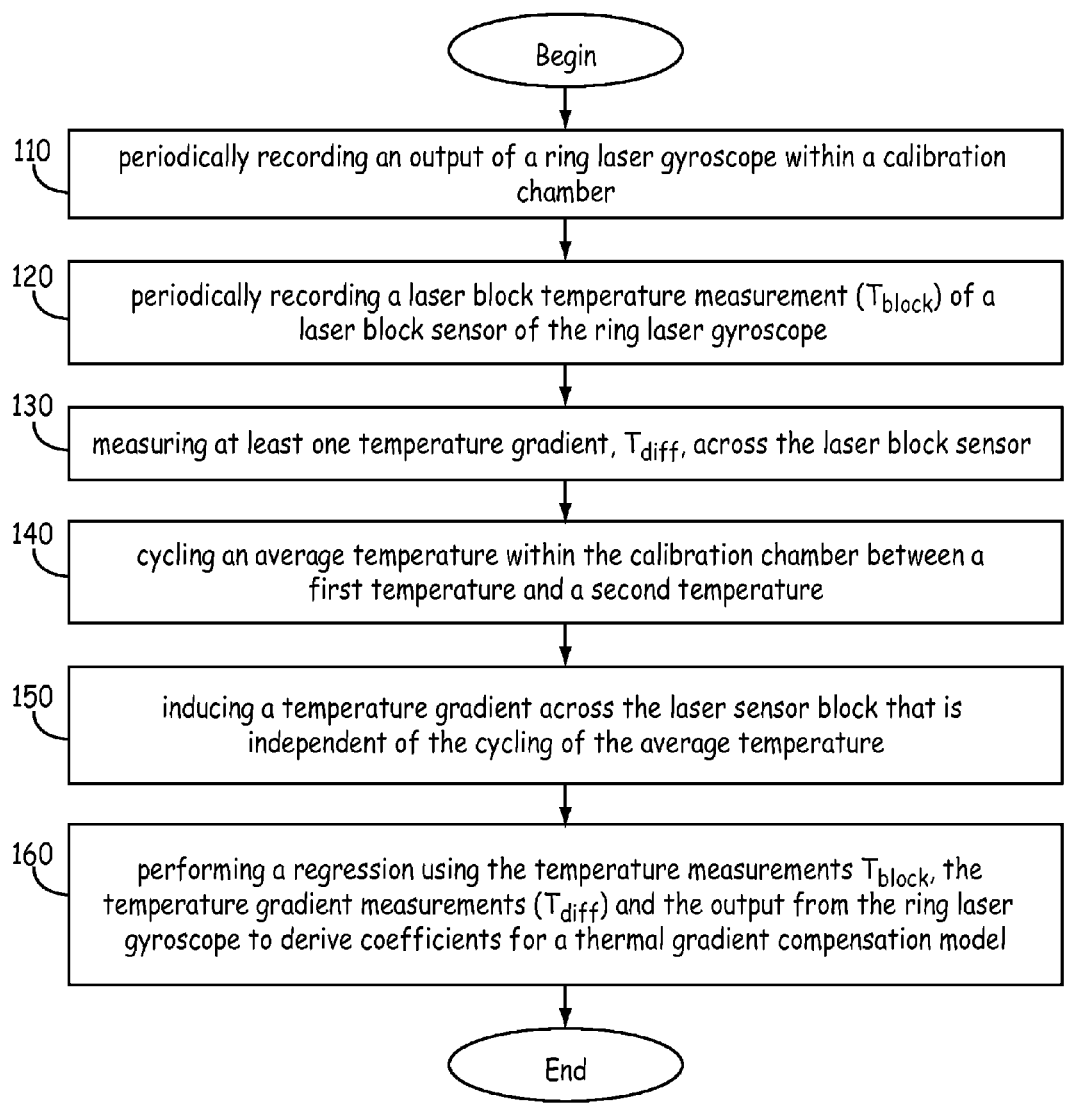
FIG. 1 is a flow chart illustrating a method of one embodiment of the present invention.

FIG. 1 is a flow chart illustrating a calibration process for developing a thermal gradient compensation model of one embodiment of the present invention. The method begins at 110 with periodically recording an output of a ring laser gyroscope within a calibration chamber. The raw output of the gyroscope will be a measurement of angle. This measurement is sampled once per period (for example, every 30 seconds) such that dividing angle measurement by the sample time provides an angular rate measurement ($\omega$). The bias error of the gyroscope is the difference in the angular rate measurement from the value it should read. For example, a polar aligned ring laser gyroscope in a calibration chamber should measure an angular rotation of 15.041 deg per hour. To the extent that the angular rate measurement is not 15.041 deg per hour, a rate bias error is present in the output of the gyroscope.

The method proceeds to 120 with periodically recording a laser block temperature measurement ($T_{block}$) of a laser block sensor of the ring laser gyroscope and to 130 with measuring at least one temperature gradient, $T_{diff}$, across the laser block sensor. The method proceeds to 140 with cycling an average temperature within the calibration chamber between a first temperature and a second temperature. For example, in one embodiment, while performing blocks 110 and 120, the temperature in the calibration chamber is cycled over a 14 hour period from room temperature to −55 C, to +85 C, back to −55 C, back to +85 C and then back to room temperature. During this cycling airflow from the chamber blows across the ring laser gyroscope, creating a thermal gradient across the laser sensor block. That is, for example, when cold air blows from right to left, the right side of the sensor block will be slightly cooler than the left side. When hot air blows from right to left, the right side of the sensor block will be slightly warmer than the left side. If this were the only heating gradient produced during calibration, then the temperature gradient ($T_{diff}$) measured at 120 would be coupled to the cycling of the chamber temperature and thus also to the laser block temperature measurement $T_{block}$. Having a linear dependence of these two measurements would produce a poor thermal gradient compensation model when the regression is performed. Accordingly, the method proceeds to 150 with inducing a temperature gradient across the laser sensor block that is independent of the cycling of the average temperature. For example, in one embodiment, within the chamber, a heat source is placed on one side of the block and operated during a portion of the cycling of the chamber's average temperature. That is, during one part of the cycling (a first half, for example) the heater is turned off. During another part of the cycling (the second the half, for example) the heater is turned on. In this way, the set of temperature gradient measurement data obtained for $T_{diff}$ is decoupled from the set of temperature measurements for $T_{block}$. The result will be a set of $T_{diff}$ measurements that, as a set, will be linearly independent from the laser block temperature measurements, $T_{block}$. This permits performance of a regression where each input to the regression is independent.

The method thus proceeds to 160 with performing a regression using the laser block temperature measurement $T_{block}$, the temperature gradient measurements ($T_{diff}$) and the output from the ring laser gyroscope to derive coefficients for a thermal gradient compensation model. For example, in one embodiment, the output of gyroscope is used to calculate angular rate measurements (w), while the laser block temperature measurements ($T_{block}$) are used to further calculate an additional three sets of data comprising $T_{block}^2$, $dT_{block}/dt$ (the time derivative of $T_{block}$), and the products $T_{block} \times (dT_{block}/dt)$, each correlated in time with the laser block temperature measurement ($T_{block}$) and the rate data from the ring laser gyroscope. Then a regression is performed on the six data sets (that is: $\omega$, $T_{block}$, $T_{block}^2$, $dT_{block}/dt$, $T_{block} \times (dT_{block}/dt)$, $T_{diff}$) to generate six coefficients ($K_1$ to $K_6$) of a thermal gradient compensation model shown by:

$$\text{Rate Bias Error} = K_1 + K_2 \times T_{block} + K_3 \times T_{block}^2 + K_4 \times dT_{block}/dt + K_5 \times T_{block} \times (dT_{block}/dt) + K_6 \times T_{diff} \quad \text{(Eq. 1)}$$

where the Rate Bias Error measurement is in angle/per unit time.

As mentioned above, in alternate embodiments, incorporating additional temperature gradient measurements for other temperature gradients across portions of the laser block are contemplated. In such embodiments, each temperature gradient would produce a separate set of temperature gradient measurements ($T_{diff-1}$, $T_{diff-2}$, ...) to be used in the regression, producing a corresponding number of additional coefficients ($K_6$, $K_7$, ...) for each temperature gradient. In another alternate embodiment, a thermal gradient compensation model is formed from an offset coefficient $K_1$ and a plurality of gradient terms such as:

$$\text{Rate Bias Error} = K_1 + K_6 \times T_{diff-1} + K_7 \times T_{diff-2} \quad \text{(Eq. 1a)}$$

The thermal gradient compensation model is then programmed into the processing elements of the ring laser gyroscope so that the gyroscope will provide bias compensated angular rate data. In operation, raw angular rate data ($\omega$) is obtained as laser block temperature ($T_{block}$) and the at least one temperature gradient ($T_{diff}$) are also measured. Using the thermal gradient compensation model shown in equation (Eq. 1), a bias compensated rate ($\omega_{comp}$) is calculated by subtracting the Bias from the raw angular rate data ($\omega$) as shown by:

$$\omega_{comp} = \omega - \text{Rate Bias Error} \quad \text{(Eq. 2)}.$$

Figure 2:
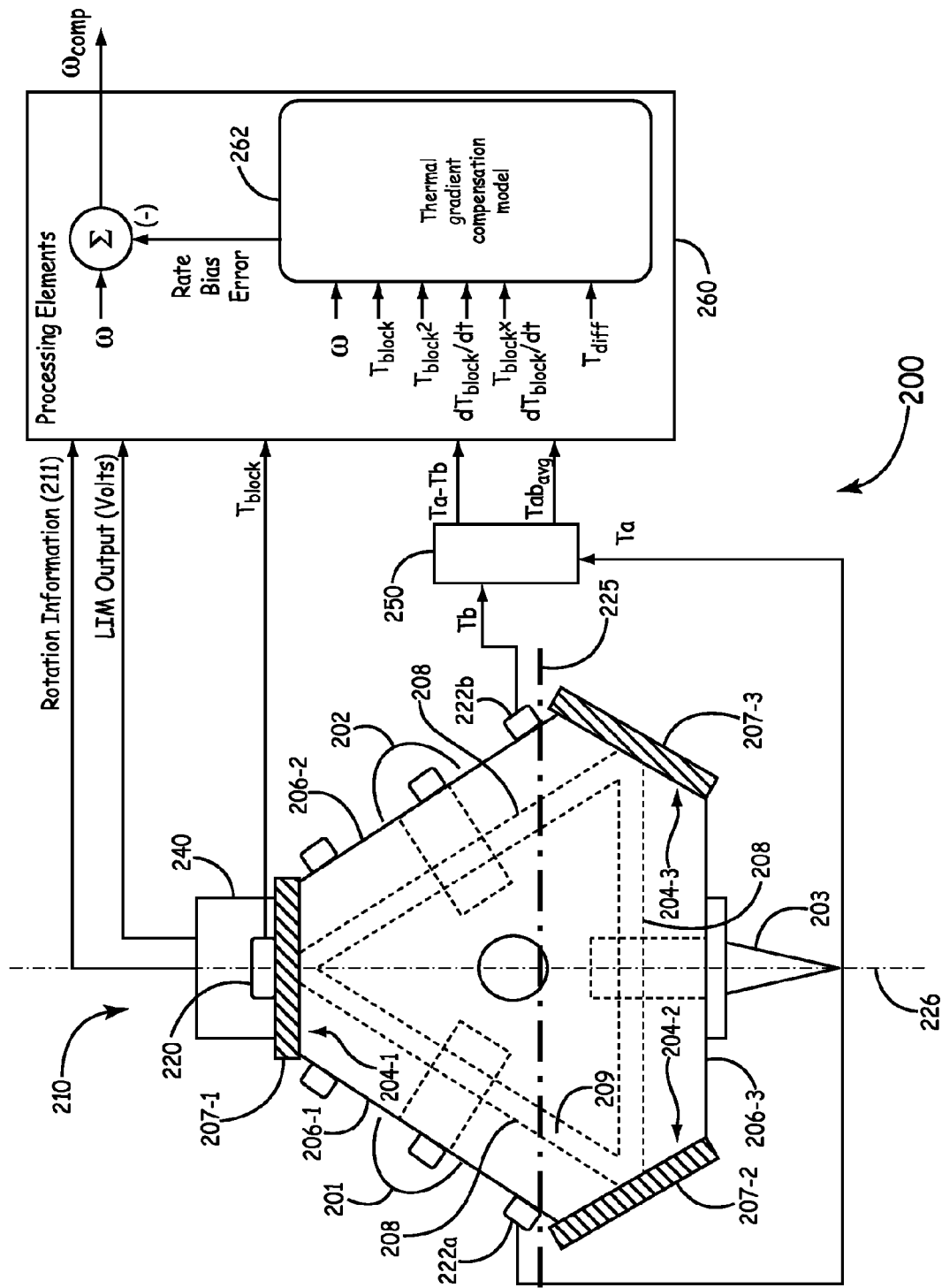
FIG. 2 is a diagram of a ring laser gyroscope of one embodiment of the present invention.

FIG. 2 is a simplified diagram of a ring laser gyroscope 200 of one embodiment of the present invention. Ring laser gyroscope 200 includes a laser block sensor 210 coupled to processing elements 260. Processing elements 260 include one or more processors, digital-to-analog-converters, memory devices and other elements as necessary to operate as described herein. In the embodiment of FIG. 2, laser block sensor 210 is triangular in shape having three sides (206-1, 206-2 and 206-3) and three blunted corners 207-1, 207-2 and 207-3. In other embodiment, laser block sensor 210 is formed from a different shape, as further discussed below.

Laser block assembly 210 includes three electrodes 201, 202 and 203 each positioned on the respective sides 206-1, 206-2 and 206-3 of the laser block sensor 210. In one embodiment, electrodes 201 and 202 are cathodes and electrode 203 is an anode. In other embodiments, the laser block assembly may alternately include two anodes at 201 and 202, and a single cathode at 203. Mirrors 204-1, 204-2, and 204-3 are located as shown at the blunted corners 207-1, 207-2 and 207-3 of laser block sensor 210, located between each of the sides 206-1, 206-2 and 206-3. Within laser block sensor 210 is a cavity 208, which in conjunction with the mirrors 204-1, 204-2, and 204-3 forms a laser beam path enclosing an area within the laser block sensor 210. The performance of ring laser gyroscope 200 is observed by coupling optical energy information from the cavity 208 to a readout assembly 240. The readout assembly 240 provides voltage signals to processing elements 260 from which the difference frequency and hence rotation information may be obtained. In addition to the rotation information, the readout assembly 240, in this embodiment, also provides a voltage signal to processing elements 260 correlated with laser intensity called the Laser Intensity Monitor (LIM) output. This LIM output provides information regarding the optical energy within the cavity 208 of ring laser gyroscope 200. In one embodiment, cavity 208 is filled with a fill gas mixture 209 of Helium and Neon. In other embodiments, other fill gas mixtures are used within cavity 208.

One of ordinary skill in the art after reading this specification would appreciate that FIG. 2 illustrates a simplified block diagram that provides sufficient detail to facilitate an enabled written description of embodiments of the present invention. Additional details not shown regarding the physical structure and electronic circuitry associated with a laser block sensor for a ring laser gyroscope are considered within the knowledge and skill of one of ordinary skill in the art and are not discussed herein.

In the embodiment of FIG. 2, Ring laser gyroscope 200 further comprises a temperature sensor 220 for measuring the laser block temperature ($T_{block}$) of the laser block sensor 210, and at least one pair of gradient temperature sensors 222a and 222b for calculating a spatial temperature gradient across a defined line (225) that traverses a portion of the laser block sensor 210. In other embodiments, values for the laser block temperature ($T_{block}$) may be obtained from temperature measurement Ta as measured by temperature sensor 222a, temperature measurement Tb as measured by temperature sensor 222b, or from a combination of sensors such as from an average of Ta and Tb.

In FIG. 2, line 225 illustrates a cross-block gradient across the axis of symmetry 226 of laser block sensor 210. The defined line 225 is provided for illustrative purposes only and should not be interpreted to limit embodiments of the present invention to only the particular line shown in FIG. 2. In other implementations and embodiments, such as those illustrated below, line 225 could be a gradient across other alternate portions of the laser block sensor 210 with temperature sensors 222a and 222b placed for measuring the spatial temperature gradient across that alternate line appropriately.

Processing elements 260 are coupled to the rotation measurement output 211 of laser block sensor 210, coupled to absolute temperature sensor 220, and coupled to gradient temperature sensors 222a and 222b. Processing elements 260 further include thermal gradient compensation model 262, which receives raw angular rate data ($\omega$) generated from the Rotation Information 211 output of laser block sensor 210, the laser block temperature measurements ($T_{block}$), and temperature gradient ($T_{diff}$) data derived from gradient temperature sensors 222a and 222b. From these parameters, thermal gradient compensation model 262 estimates a Rate Bias Error. As illustrated in FIG. 2, in one embodiment, thermal gradient compensation model 262 also receives additional parameters each derived from the laser block temperature measurement ($T_{block}$). In one embodiment, the thermal gradient compensation model 262 comprises a plurality of coefficients derived as described above with respect to FIG. 1. By subtracting this Rate Bias Error from the angular rate data ($\omega$), processing circuitry 260 outputs the bias compensated rate ($\omega_{comp}$).

In alternate embodiments, temperature sensors 220, 222a and 222b are resistive temperature devices (RTD), thermocouples, or other temperature sensors. As such, the signals illustrated by the markings $T_{block}$, Ta and Tb are proxies for temperature in the form of resistance, voltage or current measurements. In one embodiment, gradient temperature sensors 222a and 222b are platinum resistive temperature devices.

Because the temperature sensors used for temperature sensors 222a and 222b may not be of a type that provide a linear output (for example, platinum RTDs have a non-linear response curve), the temperature gradient measurements ($T_{diff}$) used with Eq. 1 are not simply the difference between Ta and Tb as measured by temperature sensors 222a and 222b. Instead, $T_{diff}$ is calculated as a function of the difference Ta-Tb that is linearized using an average temperature ($Tab_{avg}$) also derived from Ta and Tb. In the particular embodiment shown in FIG. 2, a preprocessing circuit 250 (which can be, but is not necessarily integrated with processing elements 260) senses the Ta and Tb measurements from temperature sensors 222a and 222b and from them outputs a difference signal Ta−b and average ($Tab_{avg}$) that is used by processing elements 260 to derive values for $T_{diff}$. Examples of such a circuit are described in the H0033161 application, incorporated herein by reference.

FIGS. 3a, 3b and 4 each show alternate embodiments based on determining and utilizing a thermal gradient compensation model such as discussed above with respect to FIGS. 1 and 2. As illustrated by FIG. 3a, in one embodiment, additional temperature gradient sensors such as 222c, 222d, 222e and 222f can be used to derive additional cross-block temperature gradient information Tc-Td (across line 225'), and Te-Tf (across line 225") for developing thermal gradient compensation model 262. Each additional gradient will result in an additional corresponding coefficient for thermal gradient compensation model 262.

Illustrated in FIG. 3b, other potential gradient which may be used by embodiments of the present invention include cross-bore gradients (shown by 302), along bore gradients (shown by 303). Other embodiments include top to bottom gradients (304) such as illustrated in FIG. 3c. Still other embodiments include any combination of gradients as depicted in FIGS. 2, 3a, 3b and 3c.

Further, in still other embodiments, the laser block sensor 210 need not be a triangular sensor but can be a square laser block sensor such as show at 410 in FIGS. 4a and 4b. These figures illustrates cross-block temperature differential lines 401 crossing laser block sensor 410's axis of symmetry 426 cross-bore gradients 402, along bore gradients 403, top to bottom gradients 404, which may be used individually, or in any combination in the manner described above in FIGS. 2, 3a, 3b and 3c.

In one embodiment, laser block sensor 210 is part of a gradient compensated three-axis monolithic laser block. That is, one piece of glass has bores drilled for all three axes of rotation such that this one piece of a glass block effectively contains three monolithic laser gyroscopes. In one such embodiment, the three laser gyros are nominally oriented so their sensitive input axes are orthogonal to each other. In other embodiments, other orientations can be used. Further, in another such embodiment, at least two of the triad of gyroscopes outputs a bias compensated angle rate measurement calculated as a function of at least one temperature gradient measurement, $T_{diff}$. Possible thermal gradients measured in such a block would include combinations of those already described in FIGS. 2, 3a-c and 4a-b.

FIG. 5 is a flow chart illustrating a method of one embodiment of the present invention for producing bias compensated angular rate measurements for a ring laser gyroscope. In one embodiment, the method of FIG. 5 is embodied as executable code stored in a physically non-transient memory element of processing elements 260, which when executed by processing elements 260 cause them to perform the method. As such, the method of FIG. 5, may be implemented in combination with any of the embodiments described above with respect to FIGS. 1, 2, 3a-c, and 4a-b.

The method begins at 510 with sampling an angle measurement output from a laser block sensor to obtain an angular rate measurement. The method proceeds to 512 with obtaining a laser block temperature measurement ($T_{block}$) for the laser block sensor. The method also proceeds to 514 with obtaining a temperature gradient measurement ($T_{diff}$) for at least one gradient line across a portion of the laser block sensor. While respective measurements at blocks 510, 512 and 514 may all be received at the same sampling period in a synchronized manner, in other embodiments one or more of the measurements are obtained at an independent periodicity.

In one embodiment, the laser block temperature measurement ($T_{block}$) is obtained by measuring the laser block temperature from a single temperature sensor located on the laser block sensor. In other embodiments, laser block temperature measurement ($T_{block}$) is obtained from measurements from multiple temperature sensors which are used in combination to determine the value for laser block temperature measurement ($T_{block}$).

The temperature gradient measurement ($T_{diff}$) is derived from obtaining a first measurement from a temperature sensor coupled to a first location on the laser block and a second measurement from a second temperature sensor coupled to a second location on the laser block. As explained above, when the temperature sensors used have non-linear response characteristics, the temperature gradient measurement ($T_{diff}$) is not simply the difference between the first and second measurements but is obtained as a function of a difference between the first measurement and the second measurement.

This function may include a linearization calculation that further utilizes an average of the first measurement and the second measurement.

The method proceeds to 516 with calculating a rate bias error by applying parameters produced from the laser block temperature measurement ($T_{block}$) and the temperature gradient measurement ($T_{diff}$) to a thermal gradient compensation model, wherein the thermal gradient compensation model includes at least one coefficient corresponding to the temperature gradient measurement ($T_{diff}$). As described above, the thermal gradient compensation model is based on a regression of calibration data. This calibration data includes a first measurement data set for the laser block temperature measurement ($T_{block}$) and a second measurement data set for the temperature gradient measurement ($T_{diff}$). During part of the calibration cycling as secondary heat source is applied to heat part of the laser block sensor to produce a thermal gradient across part of the sensor that is independent from any thermal coupling caused by cycling the average temperature of the calibration chamber. In this way, the set of temperature gradient measurement data obtained for $T_{diff}$ is decoupled from the set of temperature measurements for $T_{block}$. The result will be a set of $T_{diff}$ measurements that, on the whole, will be linearly independent from the laser block temperature measurements, $T_{block}$. This permits performance of a regression where each input to the regression is independent.

In one embodiment, the thermal gradient compensation model includes at least:

a first coefficient $K_1$ corresponding to an offset;
a second coefficient $K_2$ corresponding to the laser block temperature measurement, $T_{block}$;
a third coefficient $K_3$ corresponding to $T_{block}^2$;
a fourth coefficient $K_4$ corresponding to a time derivative, $dT_{block}/dt$;
a fifth coefficient $K_5$ corresponding to the product of $T_{block} \times (dT_{block}/dt)$;
a sixth coefficient $K_6$ corresponding to the temperature gradient measurement ($T_{diff}$);
and the rate bias error is calculated as a function represented by:

$$\text{rate bias error} = f(K_1, K_2 \times T_{block}, K_3 \times T_{block}^2, K_4 \times (dT_{block}/dt), K_5 \times T_{block} \times (dT_{block}/dt), K_6 \times T_{diff}).$$

Equation Eq. 1 is an example of one such function. When thermal gradient information across additional portions of the laser block sensor are available (e.g., $T_{diff-2}$), the model includes additional coefficients (such as a $K_7$) corresponding to the second temperature gradient measurement ($T_{diff-2}$), and the rate bias error is further calculated as function of $K_7 \times T_{diff-2}$. That is, each additional available gradient is addressed by the thermal gradient compensation model with a corresponding additional coefficient.

Using the thermal gradient compensation model shown, a bias compensated angular rate measurement ($\omega_{comp}$) is calculated by subtracting the Rate Bias Error from the raw angular rate data ($\omega$) as shown by:

$$\omega_{comp} = \omega - \text{Rate Bias Error}$$

Accordingly, the method proceeds to 518 with calculating a difference between the angle rate measurement and the rate bias error to produce a bias compensated angular rate measurement. In one embodiment, the bias compensated angular rate measurement ($\omega_{comp}$) is utilized to navigate a vehicle, providing more accurate navigation data for the vehicles navigation system than the raw angular rate data ($\omega$) because erroneous rate information is continuously removed in a manner that compensates for both average temperature and temperature gradients that affect the gyroscope's laser block sensor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended to cover any adaptations or variations of the present invention. Therefore, it is manifestly intended that this invention be limited only by the claims and the equivalents thereof.

What is claimed is:

1. A method for producing bias compensated angular rate measurements from a ring laser gyroscope, the method comprising:

sampling an angle measurement output from a laser block sensor to obtain an angular rate measurement;

obtaining an laser block temperature measurement ($T_{block}$) for the laser block sensor;

obtaining a temperature gradient measurement ($T_{diff}$) for at least one gradient line across a portion of the laser block sensor;

calculating a rate bias error using a processor by applying parameters produced from the temperature measurement ($T_{block}$) and the temperature gradient measurement ($T_{diff}$) to a thermal gradient compensation model, wherein the thermal gradient compensation model includes at least one coefficient corresponding to the temperature gradient measurement ($T_{diff}$); and calculating a difference between the angle rate measurement and the rate bias error using a processor to produce a bias compensated angular rate measurement;

wherein the thermal gradient compensation model includes at least:

a first coefficient $K_1$ corresponding to an offset;
a second coefficient $K_2$ corresponding to the laser block temperature measurement, $T_{block}$;
a third coefficient $K_3$ corresponding to $T_{block}^2$;
a fourth coefficient $K_4$ corresponding to a time derivative, $dT_{block}/dt$;
a fifth coefficient $K_5$ corresponding to the product of $T_{block} \times (dT_{block}/dt)$;
a sixth coefficient $K_6$ corresponding to the temperature gradient measurement ($T_{diff}$); and wherein the rate bias error $= f(K_1, K_2 \times T_{block}, K_3 \times T_{block}^2, K_4 \times (dT_{block}/dt), K_5 \times T_{block} \times (dT_{block}/dt), K_6 \times T_{diff})$.

2. The method of claim 1, further comprising:
measuring a first temperature with a sensor coupled to a first location on the laser block sensor to obtain the laser block temperature measurement ($T_{block}$).

3. The method of claim 1, further comprising:
obtaining a first measurement from a first temperature sensor coupled to a first location on the laser block; and
obtaining a second measurement from a second temperature sensor coupled to a second location on the laser block;
wherein the temperature gradient measurement ($T_{diff}$) is obtained as a function of a difference between the first measurement and the second measurement.

4. The method of claim 3, wherein the temperature gradient measurement ($T_{diff}$) is obtained as a function of a difference between the first measurement and the second measurement and an average of the first measurement and the second measurement.

5. The method of claim 1, wherein the rate bias error is calculated from an equation mathematically equivalent to $K_1+K_2\times T_{block}+K_3\times T_{block}^2+K_4\times(dT_{block}/dt)+K_5\times T_{block}\times(dT_{block}/dt)+K_6\times T_{diff}$.

6. The method of claim 1, therein the thermal gradient compensation model includes at least:
  a first coefficient $K_1$ corresponding to an offset;
  a second coefficient $K_2$ corresponding to the temperature gradient measurement ($T_{diff}$);
  a third coefficient $K_3$ corresponding to a second temperature gradient measurement ($T_{diff2}$); and
  wherein the rate bias error is a function of at least $K_1$, $K_2\times T_{diff}$, and $K_3\times T_{diff2}$.

7. The method of claim 1, wherein the thermal gradient compensation model is based on a regression of calibration data, the calibration data including a first measurement data set for the laser block temperature measurement ($T_{block}$) and a second measurement data set for the temperature gradient measurement ($T_{diff}$), wherein the second measurement data set includes gradient temperature measurements that are decoupled from average temperature measurements in the first measurement data set.

8. A bias compensated ring laser gyroscope, the gyroscope comprising:
  a laser block sensor that generates an angle measurement output;
  at least one processing element that samples the angle measurement output to obtain an angular rate measurement;
  a first temperature sensor that provides a laser block temperature measurement, $T_{block}$, for the laser block sensor; and
  a first pair of temperature sensors comprising a second temperature sensor and a third temperature sensor, wherein the first pair of temperature sensors measure a difference in temperature across a portion of the laser block sensor,
  wherein the at least one processing element converts measurements from the first pair of temperature sensors into a temperature gradient measurement ($T_{diff}$);
  wherein the at least one processing element comprises a thermal gradient compensation model that inputs parameters produced from the laser block temperature measurement ($T_{block}$) and the temperature gradient measurement ($T_{diff}$) and outputs a rate bias error, wherein the thermal gradient compensation model includes at least one coefficient corresponding to the temperature gradient measurement ($T_{diff}$); and
  wherein the at least one processing element outputs a bias compensated angle rate measurement based on a difference between the angle rate measurement and the rate bias error;
  wherein the thermal gradient compensation model includes at least:
  a first coefficient $K_1$ corresponding to an offset;
  a second coefficient $K_2$ corresponding to the laser block temperature measurement, $T_{block}$;
  a third coefficient $K_3$ corresponding to $T_{block}^2$;
  a fourth coefficient $K_4$ corresponding to a time derivative, $dT_{block}/dt$;
  a fifth coefficient $K_5$ corresponding to the product of $T_{block}\times(dT_{block}/dt)$;
  a sixth coefficient $K_6$ corresponding to the temperature gradient measurement ($T_{diff}$); and
  wherein the rate bias error = $K_1$, $K_2\times T_{block}$, $K_3\times T_{block}^2$, $K_4\times(dT_{block}/dt)$, $K_5\times T_{block}\times(dT_{block}/dt)$, $K_6\times T_{diff}$).

9. The bias compensated ring laser gyroscope of claim 8, wherein the first pair of temperature sensors further comprise a first resistive temperature device and a second resistive temperature device.

10. The bias compensated ring laser gyroscope of claim 8, further comprising a preprocessing circuit that senses a first temperature measurement from the first resistive temperature device and a second temperature measurement from the second resistive temperature device and outputs a first signal based on a difference between the first temperature measurement and the second temperature measurement, and a second signal based on an average of the first temperature measurement and the second temperature measurement; and
  wherein the at least one processing element determines the temperature gradient measurement ($T_{diff}$) from the first signal and the second signal.

11. The bias compensated ring laser gyroscope of claim 8, further comprising a second pair of temperature sensors comprising a fourth temperature sensor and a fifth temperature sensor, wherein the second pair of temperature sensors measure a difference in temperature across a second portion of the laser block sensor, wherein the at least one processing element converts measurements from the second pair of temperature sensors into a second temperature gradient measurement ($T_{diff-2}$);
  wherein the thermal gradient compensation model further includes at least a seventh coefficient $K_7$ corresponding to the second temperature gradient measurement ($T_{diff-2}$); and wherein the rate bias error is further a function $K_7\times T_{diff-2}$.

12. The bias compensated ring laser gyroscope of claim 8, wherein the thermal gradient compensation model is based on a regression of calibration data, the calibration data including a first measurement data set for the laser block temperature measurement ($T_{block}$) and a second measurement data set for the temperature gradient measurement ($T_{diff}$), wherein the second measurement data set includes gradient temperature measurements that are decoupled from average temperature measurements in the first measurement data set.

13. The bias compensated ring laser gyroscope of claim 8, wherein the first pair of temperature sensors measure a difference in temperature across a portion of the laser block sensor comprising one of:
  a cross-block gradient;
  a cross-bore gradients; and
  an along bore gradients.

14. A bias compensated ring laser gyroscope, the gyroscope comprising:
  a laser block sensor that generates an angle measurement output;
  at least one processor that samples a angle measurement of a laser block sensor to obtain an angular rate measurement, $\omega$;
  wherein the at least one processor calculates a rate bias error by applying a thermal gradient compensation model to inputs parameters produced from a laser block temperature measurement for the laser block sensor ($T_{block}$) and at least one temperature gradient measurement, $T_{diff}$, based on a temperature gradient across a portion of the laser block sensor, wherein the thermal gradient compensation model includes at least one coefficient corresponding to the temperature gradient measurement, $T_{diff}$; and
  wherein the at least one processor outputs a bias compensated angle rate measurement, $\omega_{comp}$ calculated as a function of a difference between the angle rate measurement, $\omega$, and the rate bias error;

wherein the thermal gradient compensation model includes at least:
a first coefficient $K_1$ corresponding to an offset;
a second coefficient $K_2$ corresponding to the laser block temperature measurement, $T_{block}$;
a third coefficient $K_3$ corresponding to $T_{block}^2$;
a fourth coefficient $K_4$ corresponding to a time derivative, $dT_{block}/dt$;
a fifth coefficient $K_5$ corresponding to the product of $T_{block} \times (dT_{block}/dt)$;
a sixth coefficient $K_6$ corresponding to the temperature gradient measurement ($T_{diff}$); and
wherein the rate bias error $= K_1, K_2 \times T_{block}, K_3 \times T_{block}^2, K_4 \times (dT_{block}/dt), K_5 \times T_{block} \times (dT_{block}/dt), K_6 \times T_{diff}$).

15. The bias compensated ring laser gyroscope of claim 14, the gyroscope further comprising:
a first pair of temperature sensors comprising a first temperature sensor and a second temperature sensor, wherein the first pair of temperature sensors measure a difference in temperature across the portion of the laser block sensor, wherein the at least one processing element converts measurements from the first pair of temperature sensors into the temperature gradient measurement ($T_{diff}$).

16. The bias compensated ring laser gyroscope of claim 14, wherein the thermal gradient compensation model is based on a regression of calibration data, the calibration data including a first measurement data set for the laser block temperature measurement ($T_{block}$) and a second measurement data set for the temperature gradient measurement ($T_{diff}$), wherein the second measurement data set includes gradient temperature measurements that are decoupled from temperature measurements in the first measurement data set.

17. The bias compensated ring laser gyroscope of claim 14, wherein the laser block sensor that generates an angle measurement output is comprised within a monolithic triad of gyroscopes formed from a single block; and
wherein at least two of the triad of gyroscopes outputs a bias compensated angle rate measurement calculated as a function of the at least one temperature gradient measurement, $T_{diff}$.

* * * * *